United States Patent
Plapous et al.

(10) Patent No.: US 9,355,643 B2
(45) Date of Patent: May 31, 2016

(54) EVALUATION OF THE VOICE QUALITY OF A CODED SPEECH SIGNAL

(75) Inventors: Cyril Plapous, Lannion (FR); Julien Faure, Ploubezre (FR)

(73) Assignee: ORANGE, Paris (FR)

(*) Notice: Subject to any disclaimer, the term of this patent is extended or adjusted under 35 U.S.C. 154(b) by 284 days.

(21) Appl. No.: 14/111,471

(22) PCT Filed: Apr. 4, 2012

(86) PCT No.: PCT/FR2012/050724
§ 371 (c)(1),
(2), (4) Date: Oct. 11, 2013

(87) PCT Pub. No.: WO2012/140347
PCT Pub. Date: Oct. 18, 2012

(65) Prior Publication Data
US 2014/0032212 A1  Jan. 30, 2014

(30) Foreign Application Priority Data

Apr. 11, 2011 (FR) .................................. 11 53129

(51) Int. Cl.
| | |
|---|---|
| *G10L 21/00* | (2013.01) |
| *G10L 19/00* | (2013.01) |
| *G10L 25/69* | (2013.01) |
| *H04M 3/22* | (2006.01) |
| *G10L 25/12* | (2013.01) |

(52) U.S. Cl.
CPC ................. *G10L 19/00* (2013.01); *G10L 25/69* (2013.01); *H04M 3/2236* (2013.01); *G10L 25/12* (2013.01)

(58) Field of Classification Search
CPC ....... G10L 19/00; G10L 19/025; G10L 19/04; G10L 19/06; G10L 19/12; G10L 19/173; G10L 21/00; G10L 21/003; G10L 25/00; G10L 25/12; G10L 25/60; G10L 25/69; G10L 25/78; G10L 25/003
USPC ........................ 704/275, 200, 200.1, 201, 219
See application file for complete search history.

(56) References Cited

U.S. PATENT DOCUMENTS

| | | | | |
|---|---|---|---|---|
| 6,157,830 A | * | 12/2000 | Minde | ........... H04W 24/00 455/226.1 |
| 6,201,960 B1 | * | 3/2001 | Minde | ........... H04W 24/00 455/424 |
| 7,434,117 B1 | * | 10/2008 | Chung | ........... G10L 19/005 704/219 |

FOREIGN PATENT DOCUMENTS

| | | |
|---|---|---|
| EP | 1492085 A2 | 12/2004 |
| WO | 2010/140940 A1 | 12/2010 |

OTHER PUBLICATIONS

International Search Report and English Translation of the Written Opinion dated May 30, 2012 for corresponding International Patent Application No. PCT/FR2012/050724 filed Apr. 4, 2012.

(Continued)

*Primary Examiner* — Qi Han
(74) *Attorney, Agent, or Firm* — David D. Brush; Westman, Champlin & Koehler, P.A.

(57) ABSTRACT

A method is provided for determining an indicator evaluating the voice quality of a coded speech signal. The method includes the following steps: calculation per signal frame, of a predetermined number of coefficients of a linear prediction filter for the coded speech signal; determination per frame, of a speech signal reconstructed on the basis of the filter coefficients thus calculated; obtaining per sample, of the residual between the coded speech signal and the reconstructed speech signal; calculation of an evaluation indicator on the basis of the mean or the absolute value of the residuals obtained for all the samples. Also provided are a device for determining an indicator implementing the above method, a method of evaluating the quality or of identifying the class of coding of the coded signal using the indicator determined, as well as a measurement terminal implementing these methods.

14 Claims, 4 Drawing Sheets

(56) References Cited

OTHER PUBLICATIONS

Malfait et al,: "P.563—The ITU-T standard for single-ended speech quality assessment", IEEE Transactions on Audio, Speech and Language Processing, Nov. 2006, Institute of Electrical and Electronics Engineers Inc. US, vol. 14, No. 6, Nov. 1, 2006, pp. 1924-1934, XP002663297.

Grancharov et al.: "Low-Complexity, Nonintrusive Speech Quality Assessment", IEEE Transactions on Audio, Speech and Language Processing, IEEE Service Center, New York, NY, USA, vol. 14, No. 6, 1 Nov. 1, 2006, pp. 1948-1956, XP003013947.

* cited by examiner

EVALUATION OF THE VOICE QUALITY OF A CODED SPEECH SIGNAL

CROSS-REFERENCE TO RELATED APPLICATIONS

This Application is a Section 371 National Stage Application of International Application No. PCT/FR2012/050724, filed Apr. 4, 2012, which is incorporated by reference in its entirety and published as WO 2012/140347 on Oct. 18, 2012, not in English.

FIELD OF THE DISCLOSURE

The present invention relates to a method and device for determining a voice-quality indicator for a coded speech signal in a telecommunication system.

The invention applies generally to the telecommunication domain and more specifically to measuring the transmission quality of a speech signal sent during a telephone call over a communication network, for example a mobile telephony network or a telephony network on a switched network or a packet network.

BACKGROUND OF THE DISCLOSURE

There are currently two main known types of objective method for determining the transmission quality of a coded speech signal on a communication link between a transmitter terminal and a receiver terminal: intrusive methods and non-intrusive methods.

Intrusive methods involve sending a reference signal from one extremity of the link close to the transmitter terminal and recording the degraded reference signal received at the other extremity of the link, close to the receiver terminal. The comparison between the reference signal and the degraded reference signal enables the quality of the transmission to be determined. Most commonly, the result of this determination is the attribution of a "mean opinion score" (MOS).

The quality measurement signals used in these intrusive methods overload the communication network and therefore need to be limited in number. Moreover, these signals are not real calls.

Non-intrusive methods involve measuring, at one point of the link, the data related to the coded speech signal sent between the transmitter terminal and the receiver terminal and attributing a quality score using this data.

A non-intrusive method is for example described in the document Malfait L., Berger J. and Kastner M., P. 563—*The ITU-T Standard for Single-Ended Speech Quality Assessment, IEEE Transaction on Audio, Speech, and Language Processing*, vol. 14(6), p. 1924-1934, (2006). This method is based on reconstituting the audio signal itself before degradation from the degraded audio signal sent and on the psychoacoustic models providing quality scores from the reconstituted audio signal.

However, this method is complex and requires a great deal of processing power. The complexity of this method prevents it from being used in all types of networks or terminals, and as such it is very rarely used.

A non-intrusive assessment method with no reference signal that is less complex and that requires less processing power is therefore required.

SUMMARY

An embodiment of the invention proposes a method for determining an indicator for assessing the voice quality of a coded speech signal. This method includes the following steps:
  calculation by signal frame of a predetermined number of coefficients of a linear prediction filter of the coded speech signal;
  determination by frame of a speech signal reconstructed from the filter coefficients thus calculated;
  obtaining, by sampling, the residual between the coded speech signal and the reconstructed speech signal;
  calculating an assessment indicator from the average of the absolute values of the residuals obtained for all of the samples.

Thus, the quality assessment indicator is obtained from a simply recoded degraded signal. This method is based on the principle that when an existing coded signal is recoded, the coding error committed during recoding is less than during the initial coding and depends on the type of coder used. This recoding error therefore provides an indicator showing the level of degradation incurred on the signal and therefore the voice quality thereof.

The different specific embodiments mentioned below may be joined, separately or in combination with one another, with the steps of the method for determining an assessment indicator defined above.

In one specific embodiment, the method also includes a step for determining an attack in the reconstructed signal, the indicator also being calculated as a function of the attack thus determined.

The attack thus determined makes it possible to eliminate the differences between different languages used for the speech signal. This makes it possible to weight the indicator with the attack reflecting a particular language, thereby standardizing this indicator for different languages.

In an advantageous embodiment, the method is implemented on signal frames of detected voice activity by implementing a prior voice-activity-detection step.

This makes it possible to ignore all but the wanted signal, thereby reducing the calculations to be performed and further reducing complexity.

The present invention can be applied in a first possible application to a method for assessing the voice quality of a coded speech signal that includes a step for determining an assessment indicator in accordance with the method described above and a step for comparing the indicator determined with at least one predetermined threshold to provide an assessment score.

Thus, a single indicator can be used to assess the voice quality of the coded signal. One or more predetermined thresholds can be stored in advance, for example using an experimental approach.

To obtain a more precise measurement, the assessment score is determined using a relationship dependent on the comparison of the indicator with a threshold.

In another embodiment, the present invention can be applied to a method for identifying a coding class performed on a coded speech signal, that includes a step for determining an assessment indicator in accordance with the method described above and a step for comparing the indicator determined with at least one predetermined threshold to determine a coding class.

The fact of recoding the coded audio signal enables the characteristics of the coding and therefore a predetermined coding class to be retrieved. Different coding types may be listed in advance as a function of indicator thresholds.

A coding class is simply determined using a decision tree with several thresholds.

The present invention also relates to a device for determining an assessment indicator for the voice quality of a coded speech signal. The device includes:
  a module for calculating, for each signal frame, a predetermined number of coefficients of a linear prediction filter of the coded speech signal;
  a module for determining, for each frame, a speech signal reconstructed from the filter coefficients thus calculated;

a module for obtaining, by sampling, the residual between the coded speech signal and the reconstructed speech signal; and a module for calculating an assessment indicator from the average of the absolute values of the residuals obtained for all of the samples.

This device has the same advantages as the method described above, which it implements.

The present invention also relates to a measurement terminal comprising a device for determining an assessment indicator such as the one described, means for comparing this indicator with at least one predetermined threshold and means for determining an assessment score as a function of the result of the comparison, or comprising a device for determining an assessment indicator such as the one described, means for comparing this indicator with at least one predetermined threshold and means for identifying a coding class as a function of the result of the comparison to implement the different applications mentioned above.

This measurement terminal may be an assessment probe, supervision device, server or even a communication terminal.

The invention relates to a computer program containing code instructions for implementing the steps of the method for determining an indicator and/or an assessment method and/or a method for identifying a coding class as described above, in which these instructions are executed by a processor.

Finally, the invention relates to a processor-readable storage medium, built into the device or terminal or otherwise, that may be removable and that stores a computer program implementing a determination, assessment or identification method as described above.

BRIEF DESCRIPTION OF THE DRAWINGS

Other features and advantages of the invention are set out more clearly in the description below, provided solely by way of non-limiting example and with reference to the attached drawings, in which.

DETAILED DESCRIPTION OF ILLUSTRATIVE EMBODIMENTS

Figure 1:
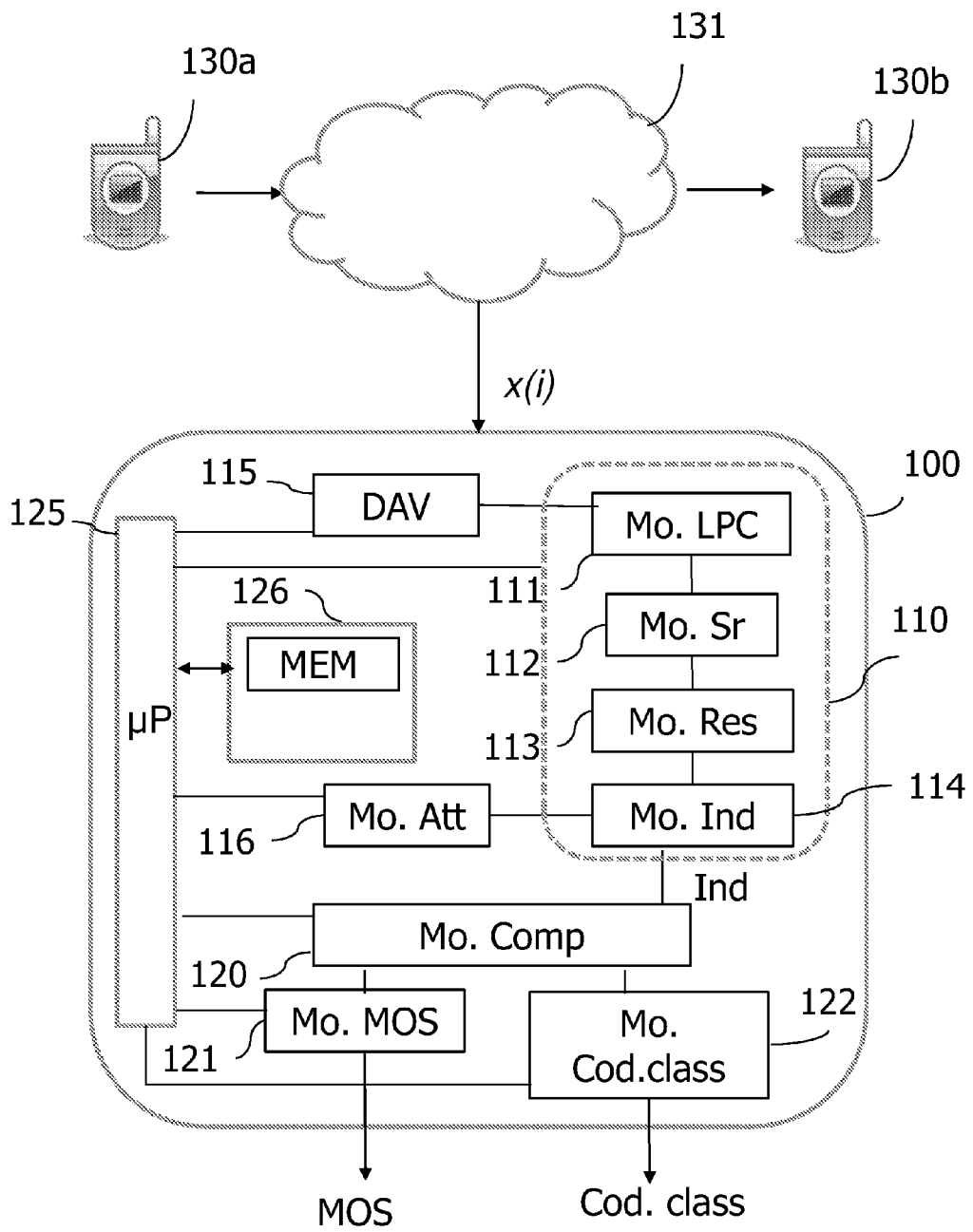
FIG. 1 shows a communication system and a measurement terminal incorporating a device for determining an indicator for assessing the voice quality of a coded speech signal according to one embodiment of the invention.

FIG. 1 shows a communication system in which a transmitter terminal 130a calls a receiver terminal 130b over a communication network 131 for example a mobile telephony network or a telephony network on a switched network or a packet network.

The voice signal is sent over the network in a coded form. The type of coding used for this speech signal differs depending on the transmitter and receiver terminals or the network. Coding may for example be speech coding standardized in ITU G.729 or G.726, G.711 or GSM-FR, IS-54 (2G standard used in North America), JD-HR (standard used in Japan), MNRU ("Modulated Noise Reference Unit" in English, from standard ITU P.810) or other types of speech coding.

This coded signal is recovered on the network by a measurement terminal that may be a measurement probe, a supervision device on the network or another terminal able to recover this signal without interfering with the current call.

This measurement terminal 100 includes a processor (μP) 125 cooperating with a memory block 126 containing a storage and/or working memory MEM.

The memory block may advantageously include a computer program containing the code instructions for performing the steps of the method for determining a voice-quality assessment indicator according to the invention, when these instructions are run by the processor and in particular the steps in which a predetermined number of coefficients of a linear prediction filter of the coded speech signal are calculated for each signal frame, a speech signal reconstructed from the filter coefficients thus calculated is determined for each frame, the residual between the encoded speech signal and the reconstructed speech signal is obtained by sampling, and an assessment indicator is calculated using the average of the absolute values of the residuals obtained for all of the samples.

Figure 2:
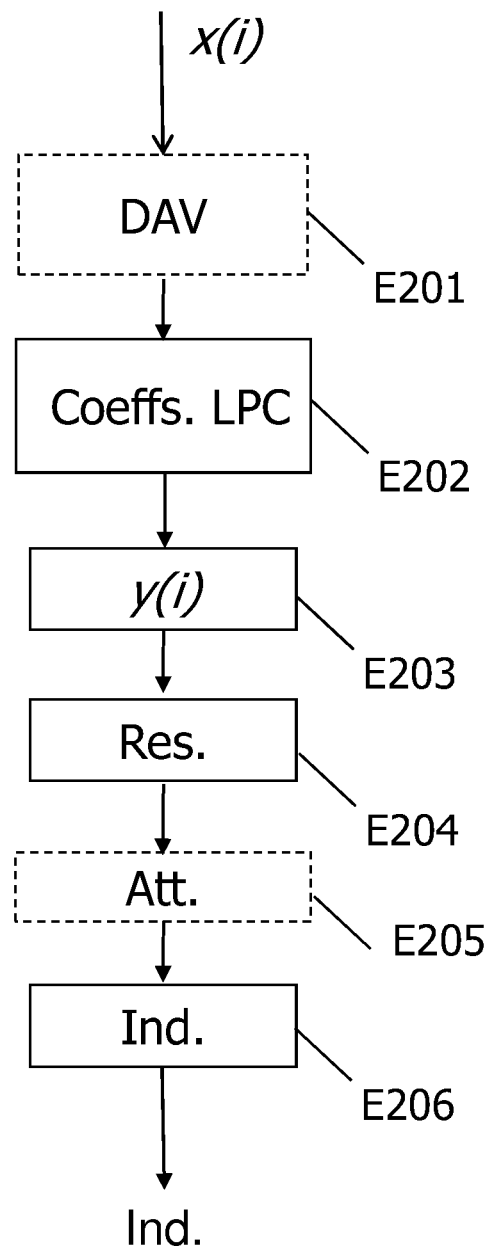
FIG. 2 is a flowchart showing the steps of a method for determining an indicator for assessing voice quality according to one embodiment of the invention.

Typically, the description of FIG. 2 includes the steps of an algorithm of such a computer program. The computer program may also be stored on a storage medium readable by a reader of the device or downloadable to the memory space thereof.

Such a measurement terminal is able to recover the coded speech signal $x(i)$, which may be degraded depending on the quality of the coding or the transmission quality over the communication network.

The measurement terminal includes a device 110 for determining a voice-quality assessment indicator according to the invention, including software modules able to implement the method according to the invention, as described in greater detail with reference to FIG. 2.

Accordingly, the device 110 includes:

a module 111 for calculating, for each signal frame, a predetermined number of coefficients of a linear prediction filter of the coded speech signal, that is able to implement step E202 described with reference to FIG. 2;

a module 112 for determining, for each frame, a speech signal reconstructed from the filter coefficients thus calculated, that is able to implement step E203 described with reference to FIG. 2;

a module for obtaining, by sampling, the residual between the coded speech signal and the reconstructed speech signal, that is able to implement step E204 described with reference to FIG. 2; and a module for calculating an assessment indicator from the average of the absolute values of the residuals obtained for all of the samples, that is able to implement step E206 described with reference to FIG. 2.

Thus, the device 110 calculates at a first instant the coefficients of a prediction filter, from the coded signal. This prediction filter is used to recode the coded signal, thereby creating a reconstructed speech signal. This reconstructed speech signal is also degraded by the coding, but to a lesser extent than the initial coding. Using this recoded signal, it is then possible to assess the degradation incurred and therefore to assess the coding quality.

Thus, a residual between the reconstructed signal and the coded signal is obtained and a quality assessment indicator is calculated on the basis of this residual.

This indicator is used both to define a coding quality level and to identify a coding class.

The measurement terminal may also include a voice activity detection module DAV 115 to distinguish between active speech zones and silent zones. The indicator according to the invention is then determined for the active speech zones identified.

The terminal 100 may also include a module 116 for determining an attack in the reconstructed signal. An attack in the speech signal will have different, language-specific features depending on the language of the signal.

Determining this attack makes it possible to weight the indicator to take account of these language differences.

This indicator is then compared to one or more thresholds that may have been determined empirically. The comparison is performed by a comparator module 120. Depending on the way this indicator is used, the one- or multi-threshold comparison makes it possible to determine an assessment score of the quality MOS of the coded signal by the module 121 or a coding class determined by the module 122. Indeed, different types of coding may be classified in advance, according to greater or lesser quality criteria. It is then possible to classify these different types of coding by quality group.

These different groups are identified as a function of the comparison of the quality assessment indicator with one or more thresholds.

FIG. 2 shows the main steps performed by the device 110 according to the invention. These steps are explained in greater detail below.

Optionally, voice activity detection may be performed in step E201.

Voice activity detection makes it possible to distinguish active speech zones from silent zones in the coded signal. The voice activity detection method is for example the method described in Annex B of the document of standard ITU-T Rec. G729 "Coding of speech at 8 kbit/s using conjugate-structure algebraic-code-excited linear prediction" (CS-ACELP), 2007.

On the basis of at least the active speech zones of the coded signal, step E202 determines a predetermined number of coefficients of an LPC prediction filter ("linear predictive coding" in English). In a possible embodiment, the order of the filter is ten and ten coefficients are therefore determined.

These coefficients are determined for example, frame by frame, using the Levinson-Durbin algorithm, which minimizes the square error between the reconstructed signal y(i) specified below and the coded signal x(i).

On the basis of the coefficients thus determined, a reconstructed signal y(i) is calculated, sample by sample, for each signal frame using the following formula:

$$y(i) = -a(2) \times x(i-1) - a(3) \times x(i-2) - \ldots - a(p+1) \times x(i-p) \quad (1)$$

where y(i) is the reconstructed signal for the sample i in an N-sample signal frame, x(i) the coded speech signal for the sample i, a the LPC coefficients and p the order of the LPC coefficients.

The reconstructed signal y(i) is therefore a "recoded" speech signal. This recoding makes it possible to incur a lesser degradation than the degradation incurred during the first coding.

Indeed, the coding makes it possible to assimilate the actual signal to a model. An error is generated by forcing the signal to be closer to the model. However, once the signal has been coded once, the distance from the simplified model used here (10-coefficient LPC) is less than what would be achieved with the original signal.

This "recoding" degradation makes it possible to assess the quality of this recoding and also provides a classification datum for this coding.

Step E204 involves determining the residual between the coded-then-degraded speech signal and the reconstructed signal, for all of the samples, using the following relationship:

$$res(i) = x(i) - y(i) \quad (2)$$

In an optional step E205, an attack in the reconstructed signal is determined. The attack corresponds to a change of energy of the speech signal. The time of an attack on a signal reveals the language used for the speech signal. One way of determining this attack on the reconstructed signal is to calculate a first derivative of the reconstructed signal. The attack is then determined as the average of the absolute values of the first derivative of the reconstructed signal, using the following equation:

$$att = \frac{1}{N-1} \sum_{i=1}^{N-1} |y(i+1) - y(i)| \quad (3)$$

where N is the total number of samples of the reconstructed signal y(i). The first derivative makes it possible to compensate for the LPC coding error difference as a function of the different languages used. Indeed, the predictive coding is for example more suited to the French language than the Japanese language. The "attack" indicator of the signal compensates for these language disparities.

Finally, in step E206, the assessment indicator of the voice quality of the coded signal is determined. If the attack of the signal is not taken into account, this indicator corresponds to the average of the absolute values of the residuals obtained for all of the samples.

If the attack is taken into account, this indicator is weighted by the attack using the following equation:

$$Ind = \frac{\frac{1}{N} \sum_{i=1}^{N} |res(i)|}{att} \quad (4)$$

The indicator is therefore independent of the language used.

Figure 3:
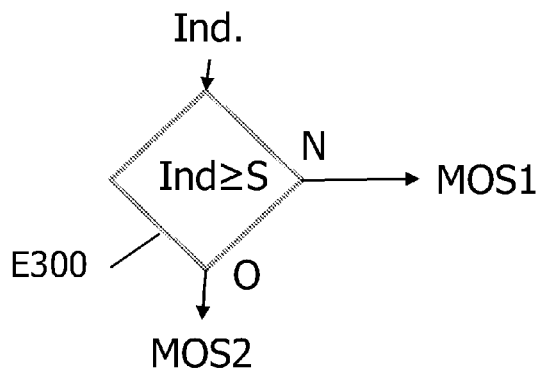
FIG. 3 is a flowchart of the steps performed for an assessment application according to the invention.

In a possible application of this indicator, FIG. 3 shows the steps performed to determine a quality score of the coded signal.

In a step E300, the indicator thus obtained is compared to a threshold S. In a specific embodiment, this threshold is for example set at 0.45.

Experimental measurements have in fact been taken to determine the effect of this indicator on the voice quality score of the coded signal. To do so, different signals coded using different coding types were tested.

The audio database used for these tests is the one defined in the document standardized in ITU-T series P, Supplement 23, "Telephone transmission quality, Telephone Installations, local line networks", (1998). This database comprises signals coded using different G.729, G.726, G.728, G.711, GSM-FR, IS-54, JD-HR and MNRU speech coders, the speakers in these speech signals using different languages (French, English, American, Japanese).

The indicators according to the invention were calculated for the 44 coding and transcoding conditions in this audio database. The averages of the 44 indicators are shown in FIG. 4 according to the corresponding voice quality scores known for these signals MOS-LQSN ("Mean Opinion Score of Listening Quality Subjective Narrowband" in English).

This figure also shows how the degradation conditions with MNRU coding do not obey the same relationship as the degradations of other types of coding. The degradations due to MNRU coding are shown for the indicator values Ind greater than 0.45, while the degradations due to other coders are shown by indicator values Ind below 0.45.

Accordingly, returning to FIG. 3, if step E300 shows that the indicator value Ind is below the threshold 0.45, the voice quality score is then determined using a first relationship MOS1. This first relationship is linear.

Figure 4:
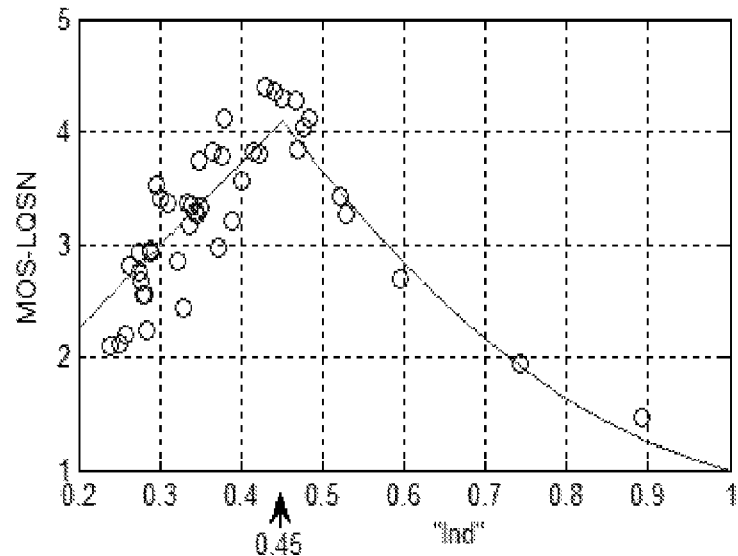
FIG. 4 shows an example value of an assessment score as a function of the indicator obtained according to the invention.

In the opposite case, if the value of the indicator is equal to or greater than 0.45, the voice quality score is determined using a second relationship, MOS2, which is a polynomial relationship, as shown in FIG. 4.

The following relationships are then obtained:

MOS1: MOS-LQON=7.34.Ind+0.79 if Ind<0.45

MOS2: MOS-LQON=7.07.Ind$^2$−15.89.Ind+9.82 if Ind≥0.45 with MOS-LQON ("Mean Opinion Score of Listening Quality Objective Narrowband" in English) representing the objective measurements obtained with the assessment indicator Ind according to the invention.

Figure 5:
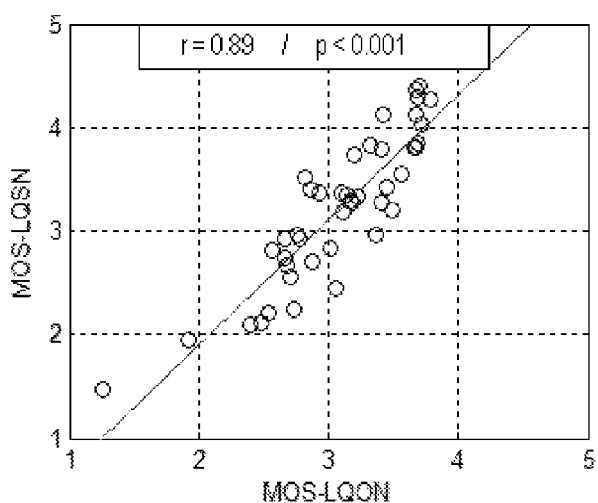
FIG. 5 shows the outcomes of an assessment according to the invention as a function of an assessment performed subjectively, i.e. by a person.

The assessment thus obtained by the indicator according to the invention performs well, as shown with reference to FIG. 5. This figure shows the correlation between the objective measurements taken according to the invention (MOS-LQON) and the existing subjective measurements for the same signals (MOS-LQSN). The correlation of around 89% obtained is very good, and is given by the Pearson correlation coefficient r (r=0.89, p<0.001), p being a precision coefficient.

Figure 6:
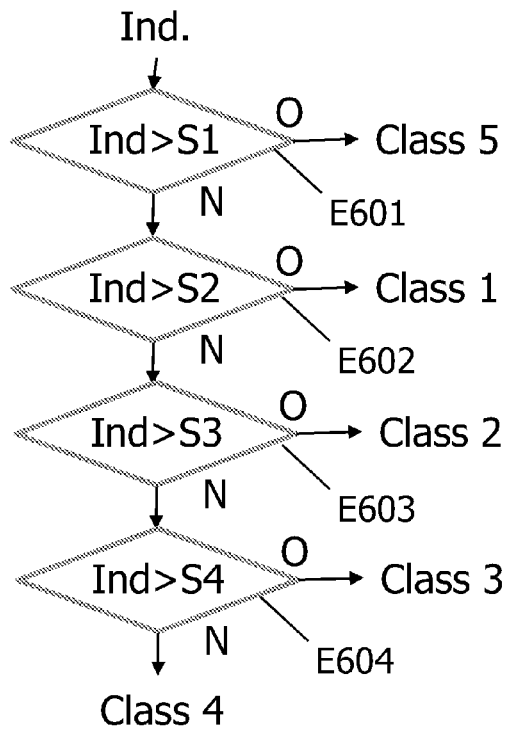
FIG. 6 is a flowchart showing the steps performed to identify a coding class according to the invention.

In another possible application of the indicator Ind, FIG. 6 shows the steps performed to determine a coding class for the coded signal.

Figure 7:
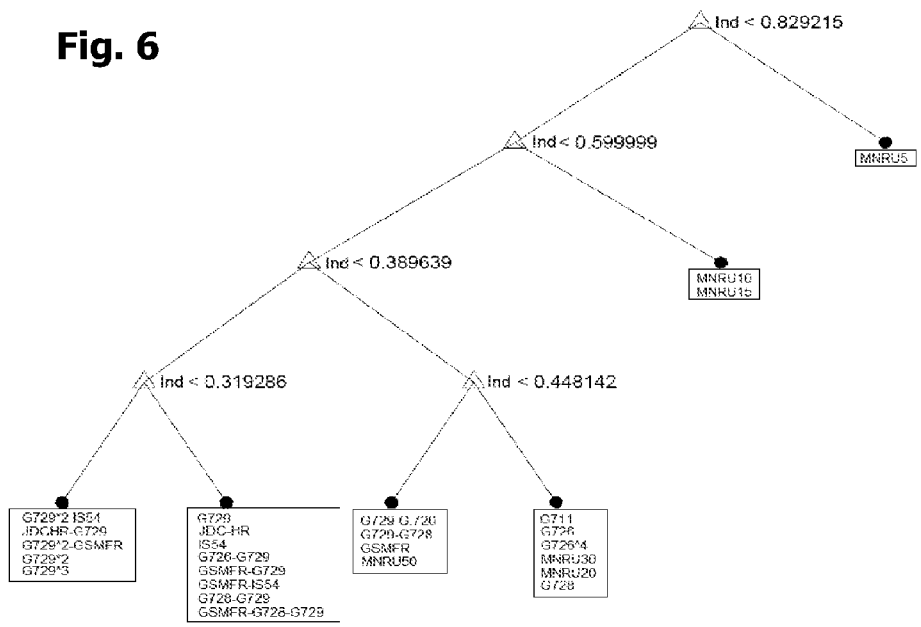
FIG. 7 is a decision tree used to identify a coding class according to the invention.

A decision tree shown in FIG. 7 groups together different types of coding and transcoding in six different classes as a function of the assessment indicator obtained.

Four thresholds are determined in this decision tree. A first threshold S1 equal to 0.59 makes it possible to distinguish the MNRU codings (5, 10 and 15) listed in class 5. Accordingly, in step E601 in FIG. 6, if the indicator is greater than S1, the coding class identified is class 5.

The numbers associated to the MNRU codings represent different coding levels of greater or lesser power.

A second threshold S2 has a value of 0.45. If the indicator is between the threshold S1 and S2, i.e. greater than S2 at step E602 in FIG. 6, then the coding class identified is class 1, grouping together G.711, G.726, G726*4, MNRU30, MNRU20 and G.728 coding. These types of coding or transcoding hardly degrade the voice signal.

A third threshold S3 has a value of 0.39. If the indicator is between S2 and S3, i.e. greater than S3 at step E603 in FIG. 6, then the coding or transcoding class identified is class 2, grouping together GSMFR and MNRU50 coding or G.729-G.726 and G.729-G.728 transcoding.

A fourth threshold S4 has a value of 0.32. If the indicator is between S3 and S4, i.e. greater than S4 at step E604 in FIG. 6, then the coding or transcoding class identified is class 3, grouping together G.729, JDC-HR and IS54 coding or G.726-G729, GSMFR-G.729, GSMFR-IS54, G.728-G.729 and GSMFR-G.728-G.729 transcoding.

If the indicator is less than S4 at step E604 in FIG. 6 (negative branch), then the coding class identified is class 4, listing the codings that significantly degrade coding quality, i.e. in the example given here, G.729*2 and G.729*3 coding and G.729*2-IS54, JDCHR-G.729 and G.729*2-GSMFR transcoding.

The multiplications associated with the coding types represent the number of transcodings performed (coding/recoding). For example, G.729*2 means that G.729 coding was performed, followed by decoding and another G.729 coding.

All of these coding types are clearly examples of coding. Other coding types or other coding classes could be used. The indicator determined according to the invention is then compared with the thresholds adapted to these other coding or transcoding types or other coding classes.

Thus, according to the invention it is possible to distinguish the main coding types used when coding the speech signal and also any transcoding that may have been applied. Thus, a significant degradation of the signal could for example be caused not by the latest coding to have taken place, but to a coding chain to be identified by the indicator.

This information makes it possible to target the origin of the degradation of the coded signal.

Although the present disclosure has been described with reference to one or more examples, workers skilled in the art will recognize that changes may be made in form and detail without departing from the scope of the disclosure and/or the appended claims.

The invention claimed is:

1. A method comprising acts of:
receiving, by a device, a coded speech signal from a communications network in which the coded speech signal was sent from a transmitter to a receiver, interconnected by the communications network, the coded speech signal comprising a plurality of frames, and the device being connected to the communications network;
for each frame of the received coded speech signal, the device performing acts of:
calculating with a processor a predetermined number of coefficients of a linear prediction filter of the coded speech signal;
generating a reconstructed speech signal for the frame from the filter coefficients thus calculated;
for a plurality of samples of the frame, comparing the coded speech signal and the reconstructed speech signal to obtain samples of residuals; and
generating with the processor an assessment indicator of voice quality of the coded speech signal from an average of absolute values of the residuals obtained for all of the samples of the frame, the assessment indicator being configured to enable targeting an origin of a degradation of the coded speech signal in the communications network.

2. The method as claimed in claim 1, wherein generating an assessment indicator further includes determining an attack in the reconstructed speech signal, the indicator also being calculated as a function of the attack thus determined.

3. The method as claimed in claim 1, further comprising:
detecting active speech zones in the coded speech signal, wherein the acts of calculating the predetermined number of coefficients, generating the reconstructed speech signal, comparing, and generating the assessment indicator are performed on the signal frames corresponding to the detected active speech zones.

4. The method as claimed in claim 1, further comprising: comparing the indicator determined to at least one predetermined threshold to obtain an assessment score.

5. The method as claimed in claim 4, wherein the assessment score is determined using a relationship dependent on the comparison of the indicator with the threshold.

6. The method as claimed in claim 1, further comprising: identifying a class of coding applied to the coded speech signal, comprising the act of determining the assessment indicator and comparing the assessment indicator to at least one predetermined threshold to determine a coding class.

7. The method as claimed in claim 6, wherein the coding class is determined using a decision tree with several thresholds.

8. A device for determining an assessment indicator of voice quality of a coded speech signal, wherein the device includes:
an input connectable to a communications network, configured to receive a coded speech signal from the communications network in which the coded speech signal was sent from a transmitter to a receiver, interconnected by the communications network, the coded speech signal comprising a plurality of frames;
a memory storing instructions; and
a processor configured by the instructions to, for each frame of the received coded speech signal:
calculate a predetermined number of coefficients of a linear prediction filter of the coded speech signal;
generate a reconstructed speech signal reconstructed for the frame from the filter coefficients thus calculated;
for a plurality of samples of the frame, compare the coded speech signal and the reconstructed speech signal to obtain samples of residuals; and
generate the assessment indicator of the voice quality of the coded speech signal from an average of absolute values of the residuals obtained for all of the samples of the frame, the assessment indicator being configured to enable targeting an origin of a degradation of the coded speech signal in the communications network.

9. The device of claim 8, wherein the device processor is configured to:
detect active speech zones in the coded speech signal,
perform the acts of calculating the predetermined number of coefficients, generating a reconstructed speech signal, comparing, and generating the assessment indicator on the signal frames corresponding to the detected active speech zones.

10. The device of claim 8, wherein the processor is further configured to:
determine an attack in the reconstructed speech signal, the indicator also being calculated as a function of the attack thus determined.

11. A memory device comprising a computer program stored thereon and incorporating code instructions for implementing a method for determining an assessment indicator when these instructions are executed by a processor of a device connected to a communications network, wherein the method comprises:
receiving, by the device, a coded speech signal from the communications network in which the coded speech signal was sent from a transmitter to a receiver, interconnected by the communications network, the coded speech signal comprising a plurality of frames;
for each frame of the received coded speech signal:
calculating with the processor a predetermined number of coefficients of a linear prediction filter of the coded speech signal;
generating a reconstructed speech signal for the frame from the filter coefficients thus calculated;
for a plurality of samples of the frame, comparing the coded speech signal and the reconstructed speech signal to obtain samples of residuals; and
generating with the processor an assessment indicator of voice quality of the coded speech signal from an average of absolute values of the residuals obtained for all of the samples of the frame, the assessment indicator being configured to enable targeting an origin of a degradation of the coded speech signal in the communications network.

12. A measurement terminal comprising:
an input connectable to receive a coded speech signal from a communications network, the coded speech signal comprising a plurality of frames and being received by the input without interfering with transmission of the coded speech signal from a transmitter terminal to a receiver terminal, which are interconnected by the communications network and are distinct from the measurement terminal;
a device configured to perform the following acts, for each frame of the received coded speech signal:
calculating a predetermined number of coefficients of a linear prediction filter of the coded speech signal;
generating a reconstructed speech signal for the frame from the filter coefficients thus calculated;
for a plurality of sample of the frame, comparing the coded speech signal and the reconstructed speech signal to obtain samples of residuals; and
generating an assessment indicator of voice quality of the coded speech signal from an average of absolute values of the residuals obtained for all of the samples of the frame, the assessment indicator being configured to enable targeting an origin of a degradation of the coded speech signal in the communications network.

13. The measurement terminal according to claim 12, further comprising:
means for comparing this indicator with at least one predetermined threshold; and
means for determining an assessment score as a function of a result of the comparison.

14. The measurement terminal according to claim 12, further comprising:
means for comparing this indicator with at least one predetermined threshold; and
means for identifying a coding class as a function of a result of the comparison.

* * * * *